Oct. 17, 1944.  S. STEUERMAN  2,360,803
VIBRATOR DEVICE
Filed April 14, 1943
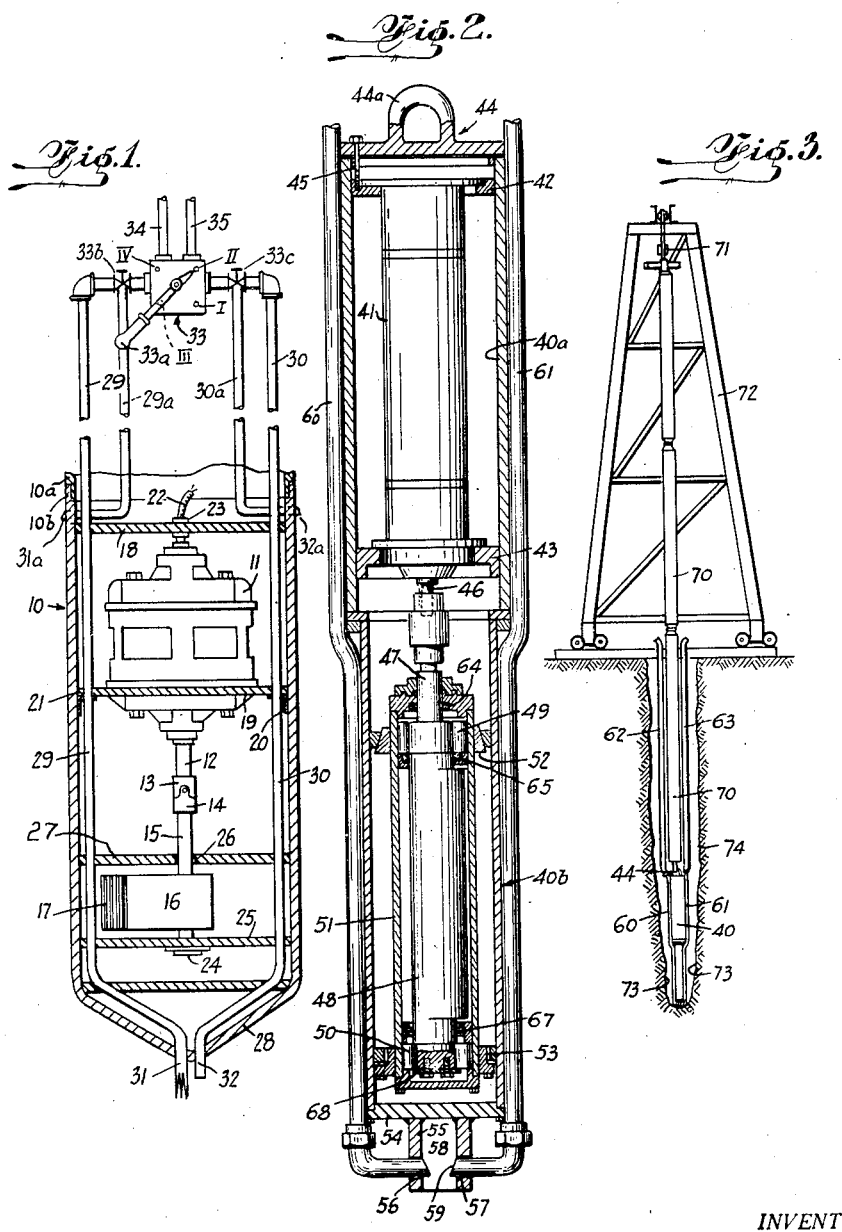
INVENTOR.
SERGEY STEUERMAN.
BY Leon M. Strauss Patented Oct. 17, 1944

2,360,803

UNITED STATES PATENT OFFICE 2,360,803

VIBRATOR DEVICE

Sergey Steuerman, New York, N. Y.

Application April 14, 1943, Serial No. 482,983

10 Claims. (Cl. 61—36)

This invention relates to improvements in devices adapted for use in displacing and compacting formable or granular masses, which possess properties similar to those inherent in earth, sand or soil, and more specifically to vibrator devices adapted to densify earth mass section by section or to form therein cavities, holes or the like having self-sustaining walls.

It is an object of the present invention to provide an elongated vibrator device of the above nature which may penetrate a mass in longitudinal direction of the device, and which is capable of transmitting impacts or vibrations to said mass in lateral direction of the device.

It is another object of the present invention to provide a device of the aforesaid type which can be easily manipulated and which is so shaped that it may unobstructively be advanced into and/or withdrawn from within the mass to be worked, whereby said mass may be displaced and densified.

A further object of the present invention resides in the provision of a device of the above nature, the housing of which being provided with at least one conduit or passage through which a liquid, such as water, or other desired fluid may be conducted preferably to the advancing end of the device.

Yet, another object of the present invention is to provide a vibrator apparatus for producing vibrations in lateral direction of said apparatus which may be exteriorly or internally equipped with one or more conduits for introducing liquid, such as water, cement paste or the like to any desired point or zone within said mass under treatment.

Still, a further object of the present invention is to provide means with which said apparatus may be fitted to facilitate penetration of the mass to be treated and also densification of the mass during and after penetration operation.

Still another object of the present invention is to provide an apparatus for producing vibrations in lateral direction of said apparatus, the latter being equipped with conduit means of fin-like structure which facilitates tamping of said mass under treatment and simultaneously serve the purpose of conducting liquid to said treated mass.

Other objects and advantages will be more apparent from the following description wherein reference is had to the accompanying sheet of drawings upon which—

Fig. 1 shows in diagrammatic form an apparatus embodying features of the invention.

Fig. 2 shows in a somewhat modified form the apparatus made in accordance with the invention.

Fig. 3 illustrates the apparatus of Fig. 2 in operation and in condition as suspended from a rollable support or derrick.

It is to be observed that the apparatus herein contemplated may be used for performing various methods in the treatment of masses, such as soil, particularly of granular soil.

The device or apparatus shown in Fig. 1, consists of a housing 10 which is watertight and is adapted for centrally placing therein driving means, as for example, an electric motor 11. Motor shaft 12 is connected through a universal joint or coupling 13—14 with the shaft 15 of the eccentric weight 16—17. Within the housing 10, there is provided the partition 18, forming the upper closure of said housing, whereas the electric motor 11 is supported on plate 19 which rests upon angle pieces or brackets 20. Between the angle pieces 20 and plate 19 there is positioned an insulating washer 21 in order to further keep the motor 11 watertight. The current supply to motor 11 is effected by cables 22 which may pass through a watertight bushing 23 provided in the closure 18. The shaft 15 of the eccentric weight 16—17 is journalled on bearing 24 of the lower closure plate 25 and passes with play through an opening 26 of the partition 27. When motor 11 is set in motion the eccentric weight arrangement 16—17 will rotate within the space formed by the partitions 25, 27 and impart lateral thrust to the partition 27 since coupling 13—14 will give. Bearing 24 and guide opening 26 transfer the vibrations of the eccentric weight 16—17 through partitions 25, 27 to housing 10. Housing 10 is provided with somewhat slanting, tapered or wedge-shaped ridges at its end 28. Any other equivalent means may be utilized to facilitate ready penetration of the mass by said device.

Through housing 10 and outside of the range of the eccentric weight there pass conduits or pipes 29, 30 which terminate at one end thereof into nozzles 31, 32, respectively. 31 is a nozzle which is preferably designed for supplying for example, cement paste or any other liquid or liquid-like substance therethrough to the mass to be treated, whereas nozzle 32 permits water or similar liquid to be conducted to the desired place below the apparatus during the operation thereof.

Pipes or conduits 29, 30 extend over the other end of the casing 10 to a valve housing 33 for said conduits or passages 29, 30, which casing is provided with handle 33a, which permits the connection of pipes 29, 30, with respective hoses or flexible pipes 34, 35. In the particular position II—III shown in Fig. 1 operation of handle 33a permits the liquid substance to flow from hose 35 to pipe 29 whereas in the position I—IV hose 34 is connected to pipe 30 to allow supply of any other liquid therethrough.

Of course it is understood that regulation of pressure and speed of the different fluids through the supply pipes may be effected in any convenient manner, for instance, by a regulating valve or cock (not shown) contained in said casing 33.

The selected liquid or liquids may have any affinity with or may chemically react with the soil.

In some cases, particularly, if it is desired to produce a liquid stream (e. g., water flow) from above and relative to the forward end 28 of the housing 10 pipes 29a and 30a are provided which terminate into nozzles 31a, 32a, respectvely, at a location above vibrator-arrangement 16, 17 and are controlled by a special cock mechanism 33b, 33c which may be preferably operatively connected with valve casing 33. Thus, liqiud flows from above and/or from below the housing end 28 may be selectively provided for a purpose, such as described, for example, in my Letters Patent No. 2,334,228 dated November 16, 1943.

In Fig. 2 a somewhat similar device embodying the invention is depicted, which comprises a watertight housing 40 containing motor 41 mounted on partitions or platforms 42, 43, the latter being secured to the inner cylindrical wall 40a of said housing. A cover or cap 44 having a handle or grip 44a may be removably fixed to platform 42 as by means of bolts 45. Motor 41, which may receive its power source in any convenient manner, has a shaft 46 pivotally or flexibly joined to shaft 47 of eccentric weight 48 mounted in suitable bearings 49, 50 located at the lower part 40b of housing 40. Eccentric weight 48 is enclosed in cylindrical casing 51 supported by annular members 52, 53, these members being secured to the cylindrical inner wall of housing 40b. An end closure plate 54 is provided, closing the advancing end of housing 40, which plate has an extending portion 55 having lateral openings 56, 57 through which project inturned forward ends 58, 59 of tubular passage members 60, 61. These tubular members 60, 61 extend longitudinally of the housings 40 and 40b and are connected to respective hoses 62, 63 (Fig. 3) for a purpose herein explained.

Suitable packings and joints, such as indicated by numerals 64, 65, 66, 67, 68, respectvlely, are provided to produce watertight connections in said lower housing 40b. In distinction to the disclosure of Fig. 1 the pipes or tubular members 60, 61 are exteriorly disposed with relation to the housings 40, 40b and act thus as additional and lateral tamping fins or tools when the vibrator device is subjected to vibrations due to the operation of motor 41 and eccentric weight 48. It is evident from the above that during the revolution of the motor 41 at high rate or speed the device of Fig. 2 swivels and oscillates about grip 44a at which the device is suspended from suitable jointed shaft 70 supported by pendant 71 of carriage or derrick 72 (Fig. 3) and thus permits in hole 73 tamping and lateral vibrating actions whereby the adjacent wall of said hole 73 is densified and compacted to provide self-sustaining lining for the hole 73. To this end, through pipes 60, 61 any chemical substances as described, for instance, in U. S. Patent No. 2,081,541 or other well-known compositions may be employed to harden and solidify this wall lining (not shown).

The device of Fig. 1 can obviously be employed for the same purpose as described with respect to Figs. 2 and 3.

A further distinction of the device shown in Fig. 2 over that illustrated in Fig. 1 resides in the fact that the working or advancing end 69 is not necessarily tapered or sloping but is shaped so as to facilitate ready penetration of the end 69 into the soil 74 in which the hole 73 is formed. The advancing end may, of course, assume any other shape, such as helical form, which is well-known in the prior art.

It is well apparent from the above that the device shown in Figs. 1 and 2 may be used to direct into the soil or void thereof structures, such as conduits, piles, etc., which may follow the vibrating device to the desired depth of the soil. The vibrating device may then be withdrawn, whereas the conduit may remain in the soil. It is obvious that the space between the conduit and the walls of the void may be filled out or supplied with material (earth), and the supplied material may simultaneously be densified. Experiments have taught that the supplied loose material will assume at least the same density and bearing power as the densified soil surrounding the void or hole.

In case that one works in the soil in very deep depths, it might be preferable to arrange with the structure, such as a conduit, to be introduced into the soil, one or more additional vibrating devices to densify or build up sustaining walls within the hole.

A similar procedure may, of course, be followed to retract or withdraw piles, conduits, etc. from within the soil.

From Fig. 1 it is further apparent that the vibrator 10 may be coupled with a structure or conduit 10a which may be of substantially the same diameter as that of the vibrator housing 10. Structure or conduit 10a is separably connected with vibrator 10 at 10b (Fig. 1), which serves as means for effecting disassociation of the vibrator housing from structure 10a. The vibrator 10 with structure 10a may be readily sunk into the soil, even if thin layers of clay material are contained in said soil or if mixtures of such material are present therein. By virtue of the soil being densified by application of the method referred to, a hole must first be formed and after the vibrator has reached the desired depth within the soil, the wall of said hole will then be densified.

This application is a continuation-in-part of my copending patent application Serial No. 282,386, filed July 1, 1939 (now U. S. Patent No. 2,334,228), and contains subject matter disclosed in my copending patent application Serial No. 428,416, filed January 27, 1942.

It is to be noted that vibrator devices according to this invention may be used for various purposes in displacing and treating earth and other formable materials, e. g., for providing holes with stabilized walls, or for densification and stabilization of successive layers of earth material of a definite area, in particular positioned in proximity of the vibrator device or devices.

It can thus be realized, that according to this invention there has been provided a device of the character described comprising a housing, agitating (motor) means within said housing, conduits passing lengthwise of said housing and extending to one end thereof to form respective nozzles, said conduits being regulatable to afford different flows of liquids through said respective nozzles, and means in driving connection with said agitating means for imparting vibrations by the latter to said housing.

While there has been shown and described and pointed out the fundamental novel features of the invention as applied to the above embodiments, it will be understood that various omissions and substitutions and changes in the form and details of the apparatus illustrated and the operation thereof may be made by those skilled in the art without departing from the spirit of the invention.

Having thus described the invention what is claimed as new and desired to be secured by Letters Patent is:

1. A vibrator device comprising a substantially fluid-tight housing, agitating means within said housing, conduits passing lengthwise of said housing and extending to one end thereof terminating into respective nozzles, regulating means connected to said conduits to afford different flows of liquids through said respective nozzles, and means in driving connection with said agitating means for imparting vibrations by the latter to said housing and substantially in transverse direction thereof.

2. In a vibrator device, a vibrator housing having a forward end adapted for penetration of earth, means within said housing for vibrating said housing laterally to its direction of penetration, conduit means extending longitudinally of and connected to said housing, said conduit means being directed toward said forward end and being adapted to conduct a liquid therethrough for permeating said earth, and means in driving connection with said vibrating means and adapted to operate said vibrating means within said housing.

3. A vibrator comprising a substantially fluid-tight housing having a forward end, means for vibrating the housing lateraly of said forward end, projecting means directed to the forward end of said housing and fixed to said housing, said projecting means being hollow and adapted to form a passageway for liquid therethrough, and means connected to said housing for operating said vibrating means.

4. In an apparatus of the kind described, an elongated vibrator housing, vibrating means for causing the walls of the housing to vibrate in directions laterally to the longitudinal axis of said housing, means at the forward end of said housing for facilitating introduction of said housing into a penetratable material to be treated, means in driving connection with said vibrating means to operate the latter, and conduit means extending along said walls of the housing and terminating in nozzles at said forward end of said housing, said vibrating means being positioned intermediate said conduit means.

5. In an apparatus of the character described, an elongated vibrator housing, means carried in said housing for vibrating the walls of the housing in directions laterally to the longitudinal axis of said housing, means at the forward end of said housing for facilitating introduction, of said housing into a penetrable material to be treated, and conduit means extending along the walls of the housing, some of said conduit means terminating in orifices at the forward end of said housing, the remaining conduit means terminating in nozzles at a location of said housing substantially above said vibrating means.

6. A vibrator device comprising an elongated housing, out-of-balance means rotatably supported within said housing for vibrating the walls of said housing in directions laterally to the longitudinal axis of said housing, an electric motor in driving connection with said out-of-balance means for rotating the latter, and conduit means extending lengthwise of the wall of said housing and terminating in orifices at the forward end of said housing, said out-of-balance means being positioned intermediate said conduit means, said orifices being disposed substantially concentrically with respect to the longitudinal axis of said housing.

7. A vibrator device comprising an elongated housing, out-of-balance means rotatably supported within said housing for vibrating the walls of said housing in directions laterally to the longitudinal axis of said housing, an electric motor in driving connection with said out-of-balance means for rotating the latter, conduit means extending lengthwise of the wall of said housing and terminating in orifices at the forward end of said housing, said out-of-balance means being positioned intermediate said conduit means, said orifices being disposed substantially concentrically with respect to the longitudinal axis of said housing, and valve means connected to said conduit means for selectively connecting said conduit means with different fluid supply sources.

8. In a vibrator device, a vibrator housing having a forward end adapted for penetration of earth, means within said housing for vibrating said housing laterally to its direction of penetration, conduit means extending longitudinally of and connected to said housing, some of said conduit means being directed toward said forward end and being adapted to conduct a liquid therethrough for permeating said earth, the remaining conduit means having orifices affording flow of liquid at a location substantially above said forward end and said vibrating means, and means in driving connection with said vibrating means and adapted to operate said vibrating means within said housing.

9. A vibrator device comprising an elongated, substantially fluid-tight housing, a tubular projection forming the forward end of said housing, power-driven out-of-balance means rotatably supported within said housing for vibrating said housing in directions laterally to the longitudinal axis of said housing, a casing enclosing said out-of-balance means and separating said out-of-balance means from said housing, and conduit means for the passage of liquid extending lengthwise of said housing and terminating in nozzles adjacent said tubular projection, said nozzles being disposed in opposed relation with respect to each other.

10. A vibrator device comprising an elongated, substantially fluid-tight housing, power-driven out-of-balance means within said housing for vibrating said housing in directions laterally to the longitudinal axis of said housing, a casing enclosing said out-of-balance means and separating said out-of-balance means from said housing, means for rotatably supporting said out-of-balance means within said housing, and conduit means including nozzles, said conduit means extending lengthwise and exteriorly of said casing and terminating in said nozzles, said nozzles being positioned adjacent the forward end of said vibrator housing.

SERGEY STEUERMAN.